Sept. 2, 1969 YOZO SASAKI ET AL 3,465,308

MAGNETIC-WIRE MEMORY MATRIX

Filed Feb. 9, 1965

INVENTORS
YOZO SASAKI
TAKASHI FURUOYA
HARUO SUGIYAMA
HIROSHI MURAKAMI

OSTROLENK, FABER, GERB & SOFFEN
ATTORNEYS 3,465,308
Patented Sept. 2, 1969

3,465,308

MAGNETIC-WIRE MEMORY MATRIX

Yozo Sasaki, Takashi Furuoya, Haruo Sugiyama, and Hiroshi Murakami, Tokyo, Japan, assignors to Nippon Electric Company Limited, Tokyo, Japan Filed Feb. 9, 1965, Ser. No. 431,318
Claims priority, application Japan, Feb. 18, 1964, 39/8,536
Int. Cl. G11b 5/62
U.S. Cl. 340—174 15 Claims

ABSTRACT OF THE DISCLOSURE

A memory matrix having a thermoplastic plate or film supporting a plurality of driving wires arranged in spaced parallel fashion. Grooves within the plate or film support the magnetic wires in each of the grooves which are arranged transversely to the driving wires. A pair of such plates are provided which sandwich the magnetic wires and driving wires, said plates having sufficient rigidity to prevent all wires within the matrix from experiencing any mechanical strain.

The instant invention relates to magnetic storage means and more particularly to a magnetic memory storage matrix comprised of a plurality of parallel magnetic wires having a thin film ferromagnetic media deposited thereon, and which is suitable for use as a memory device in electronic computers, data processing devices and the like.

Present day matrices are typically comprised of a plurality of columnar and a plurality of row windings which are arranged to intersect each other in an orderly fashion thereby forming a grid-like arrangement. In memory matrices of the type described in the instant invention, parallel magnetic wires which have a thin film ferromagnetic media deposited thereon, intersect with a driving winding with the intersection serving as an individual memory element. A binary signal which is to be stored in such a memory is written into a particular memory element by impressing an information current signal corresponding to a state of the binary signal, to flow through one of the magnetic wires containing the particular memory element and by causing a driving current to flow through one of the driving wires which passes through the particular memory element intersection in order to cause a magnetization reversal to take place. The change in magnetization takes place only at a limited portion or segment of the entire magntic media deposited along a magnetic wire with the region being limited to that which is immediately adjacent the particular memory element intersection. In order to read out a binary signal which is stored at a particular memory element intersection, such an operation may be performed by causing a driving current to flow through one of the driving wires that passes through the particular memory element intersection so that an information signal corresponding to the binary signal to be read out is obtained from the magnetic wire which passes through the particular memory element intersection.

The magnetic wires are typically manufactured by either electrodepositing or vacuum-evaporating a thin film of the order of 1 micron in thickness of a ferromagnetic substance upon a fine wire having a diameter in the range from 0.05 to 0.3 mm. and being formed of a conductive but nonmagnetic material. The ferromagnetic material which is deposited upon the fine wire may typically be comprised of an iron-nickel alloy which is prepared under the influence of a magnetic field applied to the circumferential direction of the fine wire so that the magnetic easy axis (also referred to as the axis of easy magnetization) lies in the circumferential direction of the fine wire.

Conventional memory matrices of the type described above have been produced by netting a plurality of spaced parallel magnetic wires and a plurality of substantially spaced parallel driving wires of preferably 0.1 mm. diameter in such a manner that the magnetic wires and the driving wires are "woven" in much the same way that the warp and woof of a fabric are woven. In forming a matrice of this type, it is well known that the magnetic wires may not undergo distortion and that every effort must be made so as to prevent any distortion from being introduced. It should be noted, however, that inasmuch as magnetic wires having such a thin film deposit of magnetic media thereon are extremely sensitive to mechanical strain so that the driving wires must be wrought into the fabric-like arrangement with extreme precaution. It has been found however that even employing all possible precautionary methods, the magnetic wires frequently undergo stress which acts to substantially deteriorate the necessary magnetic properties of the memory matrix.

It is therefor a primary object of the instant invention to provide a memory matrix comprised of magnetic wires of the type described, which matrix may be simply and easily manufactured and yet exhibit excellent magnetic characteristics of the type required in computer and data processing storage facilities.

The instant invention is comprised of a memory matrix which is produced by providing a thermoplastic plate or film which supports a plurality of driving wires arranged in a spaced parallel fashion. A plurality of grooves are preferably thermoplastically formed in the thermoplastic plate which supports the plurality of parallel magnetic wires in each of the grooves being formed extending transversely to the driving wires. The radius of the grooves formed is preferably a little larger than the radius of a magnetic wire. A magnetic wire is then placed in each groove and a second similarly grooved thermoplastic plate is then placed upon the assembly, such that the magnetic wires are received in a similar groove of the superimposed plate and are effectively sandwiched between the first and second thermoplastic plates which position and support the magnetic wires and driving wires and which are sufficiently rigid to prevent all wires from undergoing any mechanical strain whatsoever.

A magnetic wire memory matrix of the type described above is not only easy and simple to manufacture but is further substantially immune to deterioration of its magnetic characteristics since no strain is introduced into the magnetic wires either during manufacture of the matrix or during use thereof.

It is therefore one object of the instant invention to provide a novel magnetic memory matrix for use in digital computers and the like which employ thermoplastic plates for mechanically supporting and positioning the row and column windings forming the memory matrix.

Another object of the instant invention is to provide a novel magnetic memory matrix for use in digital computers and the like which employ thermoplastic plates for mechanically supporting and positioning the row and column windings forming the memory matrix wherein one set of windings is comprised of a plurality of fine wires having a magnetic thin film deposited thereon and which cooperates with an intersecting winding to form a memory element intersection.

Still another object of the instant invention is to provide a novel memory storage matrix for use in digital computers and the like which is comprised of thermoplastic plate members for positioning and supporting a plurality of row and a plurality of column windings which comprise the matrix wherein two or more adjacent windings may be employed in parallel as a single winding.

Another object of the instant invention is to provide a novel memory storage matrix for use in digital computers and the like which is comprised of first and second thermoplastic plate members for supporting a plurality of row and column windings comprising the matrix wherein selected windings of the matrix may be employed as short-circuiting windings to isolate and hence provide any interaction between adjacent memory element intersections.

These and other objects of the instant invention will become apparent when reading the accompanying description and drawings in which.

Figures 1, 2, 3:
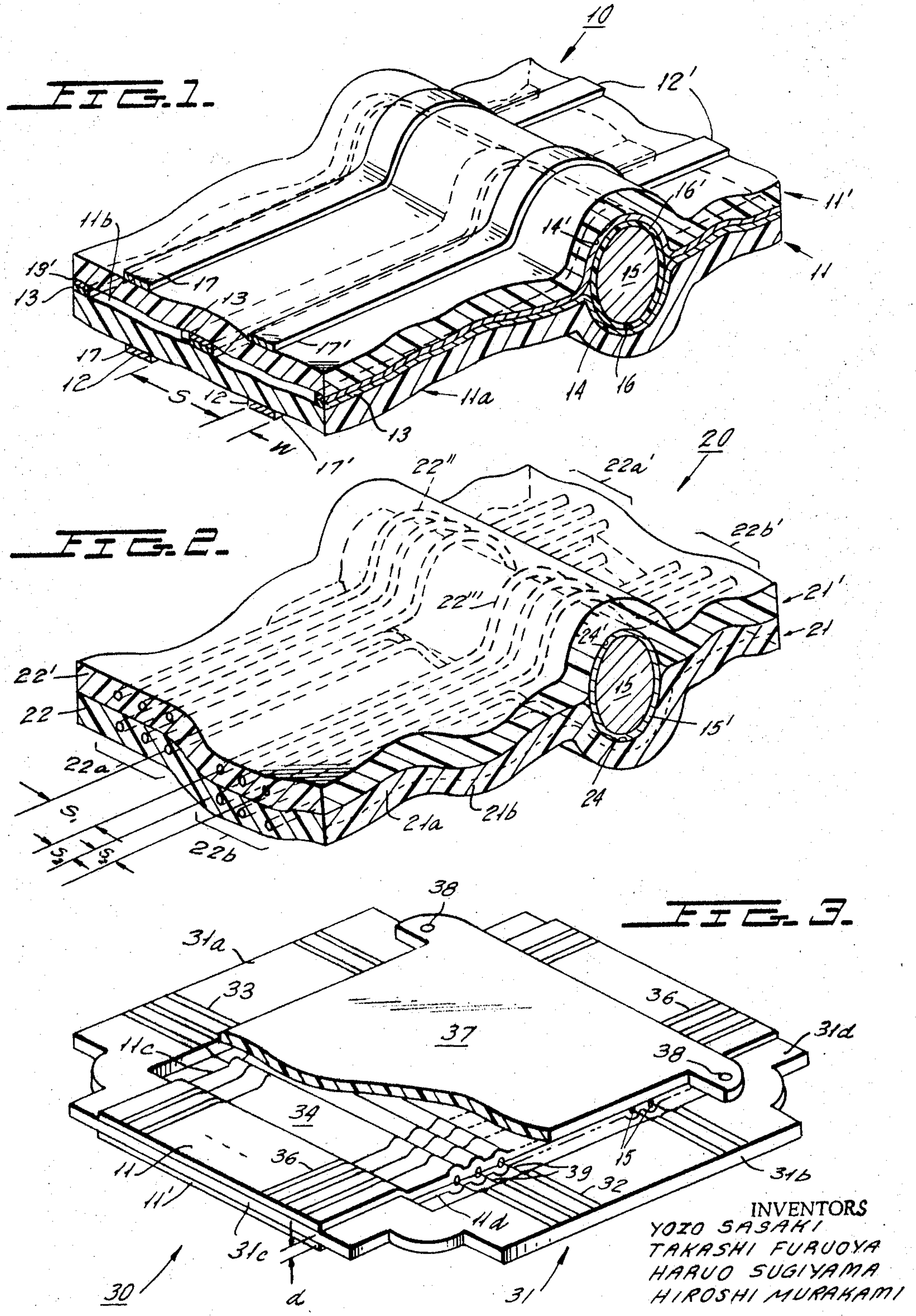
FIGURE 1 is a perspective view showing one preferred embodiment designed in accordance with the principles of the instant invention.
FIGURE 2 is a perspective view of a portion of an alternative embodiment of the instant invention.
FIGURE 3 is a perspective view, having portions thereof cut away, showing a memory device comprising a matrix designed in accordance with the principles of the instant invention.

Referring now to the drawings, FIGURE 1 shows one preferred embodiment 10 of the instant invention, which embodiment is comprised of a first polyester-resin or other thermoplastic grooved sheet 11 having a thickness in the range from 0.05 to 0.10 mm. The underside 11*a* of sheet 11 is provided with a plurality of spaced parallel printed conductive strips 12 which may, for example, be deposited on the underside of thermoplastic sheet 11 through the use of conventional printed circuit techniques. While this is one preferred method, any other method yielding similar results may be employed. The conductor strips 12 are all of substantially the same width W lying in the range from 0.2 to 0.5 mm. and all of the conductor strips 12 are equally spaced from one another by a distance S lying in the range from 1 to 2 mm.

The upper surface 11*b* of thermoplastic sheet 11 is provided with a plurality of conductor strips 13 which may be deposited on upper surface 11*b* in the same manner as the conductor strips 12 are deposited. Conductor strips 13 will have a suitable width W in the range of 0.5 to 1.5 mm. and are spaced an equal distance S apart in the same manner as conductor strips 12. The sets of conductor strips 12 and 13, however, are arranged in a staggered relationship so that each conductor strip 13 lies above and between the two closest conductor strips 12 on the under surface of thermoplastic member 11.

The upper surface of sheet 11 is provided with a plurality of grooves 14 (only one of which is shown in FIGURE 1) wherein all the grooves have substantially the same cross sectional shape, that is a semicircular shape, for the purpose of receiving and supporting a magnetic wire 15 in the manner shown. The grooves 14 and hence the magnetic wires 15 are arranged so as to be substantially perpendicular to the conductor strips 12 and 13. In order to provide suitable insulation between the conductor strips 13 on the upper surface of thermoplastic sheet 11 and the magnetic wires 15, a thin insulating film may be sprayed or otherwise deposited over the entire surface of magnetic wire 15 or conversely may be sprayed or otherwise deposited over the region of the groove 14 in order to suitably electrically insulate magnetic wires 15 from conductors 13.

The embodiment 10 is further comprised of an upper thermoplastic sheet 11' which is substantially the mirror image of the thermoplastic sheet 11 and hence that has all of its associated elements which are substantially identical to the elements of thermoplastic sheet 11 identified through the addition of a prime to each number. Thus the upper surface conductor strips 12' are substantially identical to the conductor strips 12; the under surface conductor strips 13' are substantially identical to the conductor strips 13 and the insulation deposit 16' in groove 14' is substantially identical to the insulation deposit 16 in groove 14. The conductor strips 12' are substantially superimposed directly above conductor strips 12 and the conductor strips 13' are superimposed and make physical and electrical engagement with associated conductor strips 13. The groove 14' in upper thermoplastic sheet 11' forms the other half-circle portion and cooperates with the groove 14 to fully envelop the magnetic wire 15.

The conductor strips 12 and 12' serve as the driving wires of the magnetic matrix with each pair of wires such as, for example, the pair 17 being electrically connected in any suitable manner so as to connect these wires in electrical series to form a single driving wire.

The grooves 14 and 14' may be formed to a high degree of precision in material such as a polyester-resin, by inserting the polyester sheet which has already been printed with the conductor strips between a pair of molds (not shown) having complementing configurations for forming the grooves and placing the polyester-resin sheet which is sandwiched between the pair of molds into an oven maintained at a temperature of 120° C. for approximately 30 minutes. After the heating stage, the sheet is removed from the oven and separated from the pair of molds after the temperature has been lowered to room temperature. While a temperature level of substantially 120° C. is suitable for polyester-resin, it should be understood that the molding temperature selected should be compatible with the type of thermoplastic resin employed. Thus the selection of any other suitable thermoplastic resin thereby requires accommodation in the temperature level of the heating process. In order to substantially reduce the elapsed time required for the heating process, it is preferable to preheat the mold pairs. This reduces the actual heating process to a period not exceeding several minutes. If desired, the cooling process may be carried out through forced cooling methods.

After completion of the groove forming operation of thermoplastic plates, the magnetic wires 15 are inserted within the groove so formed so as to be sandwiched between two such polyester-resin plates which are superimposed upon one another to yield the final assembly. The above molding and assembling steps yield a magnetic-wire memory matrix without imposing any strain whatsoever upon the magnetic wires 12.

The thermoplastic sheets 11 and 11' may be composed of a two-fold sheet, the upper and lower portions of the two-folded sheet corresponding to the thermoplastic sheets 11' and 11, respectively. The two-folded sheet is folded in two in the neighborhood of the middle of the sheet so as to be placed in engagement with associated grooves provided in the upper and lower portions of the sheet to form an elongated opening of substantially circular cross-section and with each of the conductor members in the upper and lower portions of the two-folded sheet in alignment and in close proximity. The thermoplastic sheet of this construction has the merit that the connection between the conducting members at one end of the sheet is eliminated.

In the case where any change in position of the thermoplastic sheet 11 with respect to the sheet 11' gives rise to an undesired change in the electronic properties of the memory matrix manufactured in accordance with the present invention, it is preferable to adhere tightly the sheet 11 with the sheet 11' so as to support and position the pluralities of spaced parallel conducting wires and of spaced parallel magnetic wires. This procedure is easily done by pressing the two sheets 11 and 11', whose upper and lower surfaces are coated with a suitable binding agent such as EC 776 manufactured by Minnesota Mining and Manufacturing Company in U.S.A., tightly together in such manner that a groove in the sheet 11 cooperates with a groove in the sheet 11' to form an elongated opening of substantially circular cross-section in which a magnetic wire may be inserted, and then heating them at an elevated temperature in the range 100° C. to 200° C. to accomplish the binding between the two sheets. After cooling the sheets down to room temperature, magnetic wires are inserted in the holes formed as mentioned above.

Considering the embodiment 10 of FIGURE 1 there is provided therein two independent memory element intersections. These intersections are defined by the driving wire pairs 17 and 17' and the magnetic wire 15. The total number of memory elements within a matrix is equal to the product of the row and column windings provided within such a matrix. For example, in the case where 50 row (or columnar) windings of magnetic wires 15 are provided and wherein 50 columnar (or row) driving wires 17 are provided, such a matrix would yield a total of 2500 memory elements. It should be understood that this is merely exemplary and a greater or lesser number of row and column windings may be employed depending only upon the needs of the user.

In the embodiment 10 of FIGURE 1, the associated conductor strips 13 and 13' make physical engagement with one another. It should further be noticed that each of these contacting pairs 13 and 13' are located between adjacent driving wire pairs. By suitably galvanically connecting the associated pairs of conductor strips 13 and 13' such as by soldering, for example, these pairs act as short-circuiting wires for eliminating or reducing any electric and magnetic disturbance between adjacent driving wires so that no significant electrical interaction can occur between the driving wire pairs 17 and 17', for example, when the short-circuiting conductor strips 13 and 13' located therebetween are suitably electrically connected.

As an alternative embodiment, it is possible to reverse the roles of the conductor strips 13 and 13' with the conductor strips 12 and 12' so that the conductor strips 13 and 13' cooperate to act as the driving wires and the conductor strips 12 and 12' cooperate to act as the short-circuiting wires. As another alternative, the short-circuiting wires may be omitted if the spacing between the driving wires is such as to prevent any significant interaction between adjacent driving wires.

FIGURE 2 shows another preferred embodiment 20 of the instant invention which is comprised of thermoplastic sheets 21 and 21' substantially identical to the thermoplastic sheets 11 and 11' of FIGURE 1. In the embodiment 20, the thermoplastic sheet 21 has imbedded therein a plurality of fine wires 22 which are arranged in spaced parallel fashion. One suitable thin wire which may be employed is that wire sold by the Sumitomo Electric Company Limited of Osaka City, Japan which wires are identified by the trademark Sumiflat.

The thermoplastic sheet 21 is provided with a groove 24 which defines a half-circle for receiving the magnetic wire 15 in the same manner as previously described with respect to the embodiment of FIG. 1.

The upper thermoplastic sheet 21' is substantially identical to sheet 21 and has fine wires 22' embedded therein in the same manner as in the sheet 21. A like groove 24' is provided in sheet 21'. The grooves 24 and 24' and hence the magnetic wire 15 is arranged so as to be substantially perpendicular to all of the thin wires 22 and 22'.

The grooves 24 and 24' may be formed to a high degree of precision in a like manner as previously described with regard to the embodiment of FIGURE 1 by heating the molds employed (not shown) up to 100° C. in an embodiment employing a polyester series resin containing the Sumiflat wire.

In the case where any change in position of the Sumiflat wire 21 with respect to 21' gives rise to an undesired change in the electric properties of the memory matrix, the Sumiflat wire 21 is to be adhered by means of a binding agent in the same manner described in the embodiment shown in FIG. 1.

One of the preferred methods of the construction of the Sumiflat wire is to embed the fine copper wires having the radius in the range 0.05 mm. to 0.2 mm. The fine wires 22 are arranged in groups **22*a*, 22*b*, 22*a'* and 22*b'* as shown in FIG. 2. The spacing $S_2$ between adjacent wires within each group is substantially unchanged and the spacing $S_1$ between adjacent groups is also substantially unchanged with the proviso that the value $S_1$ is greater than the value $S_2$. Typical value of $S_1$ is in the range 0.7 mm. to 2.0 mm., and typical value of $S_2$ is in the range 0.2 mm. to 0.5 mm., and the number of the fine wires in each group (22*a*, 22*a'*, 22*b* and 22*b'*) is in the range 1 to 5. The sheet 21' should be attached to the sheet 21 in such a manner that the groups 22*a'* and 22*b'* lie immediately above 22*a* and 22*b*, respectively, and a groove 24' in the sheet 21' cooperates with groove 24 in sheet 21 to substantially envelope the magnetic wire 15**.

Connecting these fine wires in group **22*a* with those in group 22*a'* and those in group 22*b* with those in 22*b'* in a suitable manner, composite driving wire assemblies are thereby provided. For example, by connecting all of the wires 22 and 22' in the groups 22*a* and 22*a'* in electrical series connection, a single driving wire having the same number of turns as that of the wires in each group is thereby formed to generate a resultant magnetic field, by flowing a signal current through the driving wire, for acting upon the magnetic thin film 15' deposited upon magnetic wire 15 in the immediate region of the wires in groups 22*a* and 22*a'* to produce a resultant strength in magnetic field thereby facilitating the magnetic inversion of the magnetic material 15'** and further to expedite the speed at which the inversion takes place thereby making it possible to store information within a magnetic memory element through the use of a small driving current and of a small digit current through the magnetic wire and to read out an information signal of large amplitude.

The spacing $S_1$ is determined by the condition that the effects of the digit current flowing through the magnetic wire 15 and of the word current flowing through the driving wire adjacent to the particular memory element in which some information has been stored become negligible. Thus the minimum value of the spacing $S_1$ depends on the values of digit and word currents, construction of the memory matrix and magnetic properties of the magnetic thin film 15'. A typical range of $S_1$ adopted in our experiments, was described previously.

If it is desired to reduce any possible interaction between adjacent driving wire groups, the end wires such as, for example, the end wires 22'' and 22''' may be galvanically joined in the same manner as the conductor strips 13 and 13' of FIG. 1 in order to provide the short-circuiting ring effect previously described.

Another preferred embodiment of the construction of Sumiflat wire is to embed the fine wires with equal spacing, that is, $S_1$ is equal to $S_2$. In this case the fine wires between the adjacent driving wires are short-circuited to reduce any possible electric and magnetic interaction between the adjacent driving wires.

Another preferred embodiment of the construction of the Sumiflat wire is to replace a group of short-circuited wires between the adjacent driving wires described in the above embodiment with a thin strip of metal such as copper. This construction not only exhibits a good performance in reducing the electric and magnetic interactions between the adjacent driving wires but also results in a decrease of labor time in assembling the memory matrix.

Whereas the embodiment of FIGURE 1 shows conductor strips and the embodiment of FIGURE 2 shows fine wires, it should be understood that wire strips may be embedded within the thermoplastic-resin and fine wires may be deposited or provided along the surfaces of the thermoplastic sheets. As an additional alternative, the thermoplastic sheets 21 may be formed of two separate sheets **21*a* and 21*b*** as shown in FIGURE 2 between which the fine wires (or conductor strips) may be deposited and finally by fusing these two sheets together to form a single interval sheet.

Referring to FIGURE 3, there is shown therein a memory "plane" 30 having a memory matrix generally of the type shown in either FIGURE 1 or FIGURE 2 and which is comprised of a frame 31 formed of a suitable insulating material having a plurality of magnetic wire terminals 32 and 33 which may, for example, be deposited by a printed circuit technique, along the sides 31*a* and 31*b*, respectively. The magnetic wire terminals 32 and 33 are substantially parallel to one another and are spaced by a distance substantially equal to the spacing between adjacent magnetic wires 15 (or 15'). A memory matrix 34 having a basic design such as shown in either FIGURE 1 or FIGURE 2 has its thermoplastic sheets 11 and 11' spaced a predetermined distance *d* apart along opposing marginal edges in order to receive the sides 31*c* and 31*d* respectively of insulating frame 31. The thermoplastic sheets 11 and 11' are suitably joined to the sides 31*c* and 31*d* by any suitable adhesive means.

The driving wires 36 extend in opposite direction to the marginal edges of thermoplastic sheets 11 and 11' so as to be available for electrical connection thereto along the sides 31*c* and 31*d* of frame 31.

A protective sheet member 37 is placed over the upper surface of the memory matrix 34 and is suitably secured to the insulating frame 31 at the four corners of sheet member 37 by the fastening means 38. Only two of the corners and fastening members 38 are shown in FIGURE 3 for purposes of simplicity, it being understood that the protective sheet 37 spans the entire upper surface of memory matrix 34. A second protective sheet (not shown) covers the under side of memory matrix 34 and is secured to the insulating frame 31 in the same manner as sheet 37. A protective sheet may be formed of a non-magnetic metal or an insulating material. Prior to the positioning of the protective sheets, the magnetic wire terminals 32 and 33 are suitably joined to the magnetic wires 15 by means of the conductors 39 which are electrically connected to the magnetic wires 15 in terminals 32 and 33 in any suitable manner. As an alternative arrangement, the magnetic wires 15 may extend beyond the edges 11*c* and 11*d* of thermoplastic plates 11 and 11' and have their extreme ends suitably electrically connected to the terminals 32 and 33.

In the case where the memory "plane" 30 employs a memory matrix of the type 10 shown in FIGURE 1, it is possible to print the driving wire terminals 36 simultaneously with and as an integral part of the conductor strips 12 and 12'.

One practical embodiment of the type 30 shown in FIGURE 3 which has been produced had overall dimensions of 75 mm. by 75 mm. and was comprised of 50 drive windings and 50 magnetic wires yielding a total of 2500 memory elements. As previously mentioned, it should be understood that the overall dimensions and the total number of columnar and row windings and hence the total number of memory elements may be suitably adjusted depending only upon the needs of the user. As regards the embodiment 10 of FIGURE 1, it should be understood that the distance between adjacent conductor strips and between adjacent magnetic wires was selected for the convenience of attaching lead wires to driving wire terminals and to the magnetic wire terminal, and further for the purpose of reducing the possible mutual magnetic interaction between adjacent magnetic wires. These distances provided in the specification should not, however, be considered as being critical.

It can therefore be seen that the instant invention provides a magnetic wire matrix assembly which is simple to manufacture and which imposes no mechanical strain whatsoever upon the magnetic wires of the matrix yielding a matrix assembly having the excellent characteristics for use as a storage means.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. A magnetic-wire memory matrix comprising first and second thermoplastic sheets; each of said sheets positioning and supporting a plurality of spaced parallel conductive members and being provided with a plurality of elongated spaced parallel grooves arranged substantially perpendicular to said conductive members; said first and second thermoplastic sheets being placed in engagement with associated grooves being in registry to form an elongated opening of substantially circular cross-section, and with associated conductor members in alignment and in close proximity to one another; a plurality of magnetic-wire members each being positioned within an associated opening.

2. A magnetic-wire memory matrix comprising first and second thermoplastic sheets; each of said sheets positioning and supporting a plurality of spaced parallel conductive members and being provided with a plurality of elongated spaced parallel grooves arranged substantially perpendicular to said conductive members; said first and second thermoplastic sheets being placed in engagement with associated grooves being in registry to form an elongated opening of substantially circular cross-section, and with associated conductor members being in alignment and in close proximity to one another; a plurality of magnetic-wire members each being positioned within an associated opening; each of said magnetic wires being comprised of a fine nonmagnetic wire having a ferromagnetic thin film deposited over the surface of said wire.

3. The device of claim 1 wherein the conductive members are embedded within the associated thermoplastic member.

4. The device of claim 1 wherein the conductive members are embedded within the associated thermoplastic member; a selected member of said conductive members being arranged in groups; the distances $S_1$ between conductive members being substantially equal; the distances $S_2$ between adjacent groups being substantially equal, wherein $S_2$ is substantially not smaller than the distance $S_1$.

5. The device of claim 1 wherein alternating associated conductive members in alignment are connected.

6. The device of claim 1 wherein alternating associated conductive members in alignment are connected to form short-circuiting rings to prevent electric and magnetic interaction between the remaining associated conductive members.

7. The device of claim 1 wherein said conductive members are arranged along the opposing surfaces of each thermoplastic sheet; the conductive members along one of said surfaces being staggered relative to the conductors arranged along the remaining surface.

8. The device of claim 1 wherein said conductive members are arranged along the opposing surfaces of each thermoplastic sheet; the conductive members along one of said surfaces being staggered relative to the conductors arranged along the remaining surface; the conductors arranged along the engaging surfaces of said thermoplastic sheets being connected to form short-circuit rings to prevent electric and magnetic interaction between the remaining associated conductive members.

9. The device of claim 1 wherein said conductive members are arranged along the opposing surfaces of each thermoplastic sheet; the conductive members along one of said surfaces being staggered relative to the conductors arranged along the remaining surface; the conductors arranged along the nonengaging surfaces of said thermoplastic sheets being connected to form short-circuiting rings to prevent electric and magnetic interaction between the remaining associated conductive members.

10. A memory matrix assembly comprising a matrix of the type described in claim 1 and further having an insulating frame having an opening substantially surrounding and receiving said memory matrix; first and second opposing ends of said thermoplastic sheets being secured to first and second sides of said frame; first and second protective cover members secured to opposing surfaces of said frame and substantially fully enclosing said memory matrix; the remaining sides of said frame being provided with a plurality of spaced parallel conductive members for electrically connecting an associated magnetic-wire thereto.

11. The device in claim 1 wherein said conductive members supported by said thermoplastic sheets are elongated flat conductive strips formed by a printed circuit technique.

12. The device in claim 10 wherein said conductive members supported by said thermoplastic sheets and said frame are elongated flat conductive strips formed by a printed circuit technique.

13. The device of claim 1 wherein said first and second thermoplastic sheets are stuck together.

14. The device of claim 1 wherein said first and second thermoplastic sheets are formed of upper and lower portions of a two-folded sheet, respectively.

15. The device of claim 13 wherein said first and second thermoplastic sheets are formed of upper and lower portions of a two-folded sheet, respectively.

References Cited

UNITED STATES PATENTS

| | | | |
|---|---|---|---|
| 3,195,116 | 7/1965 | Weisz et al. | 340—174 |
| 3,200,383 | 8/1965 | James | 340—174 |
| 3,319,234 | 5/1967 | Brette | 340—174 |

FOREIGN PATENTS

| | | |
|---|---|---|
| 1,379,698 | 10/1964 | France. |
| 1,379,699 | 10/1964 | France. |

BERNARD KONICK, Primary Examiner

J. F. BREIMAYER, Assistant Examiner

U.S. Cl. X.R.

29—604, 625; 174—68.5, 117